(12) United States Patent
Li et al.

(10) Patent No.: US 9,081,587 B1
(45) Date of Patent: Jul. 14, 2015

(54) MULTIVERSIONED FUNCTIONS

(71) Applicant: GOOGLE INC., Mountain View, CA (US)

(72) Inventors: Xinliang David Li, Palo Alto, CA (US); Sriraman Tallam, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 13/775,984

(22) Filed: Feb. 25, 2013

Related U.S. Application Data

(60) Provisional application No. 61/638,427, filed on Apr. 25, 2012.

(51) Int. Cl.
*G06F 9/45* (2006.01)

(52) U.S. Cl.
CPC . *G06F 8/443* (2013.01); *G06F 8/41* (2013.01); *G06F 8/44* (2013.01)

(58) Field of Classification Search
CPC .............. G06F 8/41; G06F 8/44; G06F 8/443
See application file for complete search history.

(56) References Cited

U.S. PATENT DOCUMENTS

| | | | | |
|---|---|---|---|---|
| 6,895,580 B2 * | 5/2005 | Bates et al. | | 717/157 |
| 7,036,116 B2 * | 4/2006 | Haber et al. | | 717/151 |
| 7,058,561 B1 * | 6/2006 | Kumar | | 703/22 |
| 7,401,330 B2 * | 7/2008 | Li et al. | | 717/162 |
| 7,426,725 B2 * | 9/2008 | Moon et al. | | 717/157 |
| 8,370,821 B2 * | 2/2013 | Haber et al. | | 717/151 |
| 8,578,355 B1 * | 11/2013 | Mars et al. | | 717/153 |
| 2004/0015927 A1 * | 1/2004 | Haber et al. | | 717/155 |
| 2005/0144606 A1 * | 6/2005 | Li et al. | | 717/162 |
| 2005/0188362 A1 * | 8/2005 | Metzger et al. | | 717/151 |
| 2005/0188363 A1 * | 8/2005 | Moon et al. | | 717/157 |
| 2007/0157178 A1 * | 7/2007 | Kogan et al. | | 717/130 |
| 2009/0055813 A1 * | 2/2009 | Haber et al. | | 717/158 |
| 2009/0199168 A1 * | 8/2009 | Hamada et al. | | 717/151 |
| 2014/0245271 A1 * | 8/2014 | Miller et al. | | 717/146 |

OTHER PUBLICATIONS

Liao, Chunhua, et al., Effective source-to-source outlining to support whole program empirical optimization, [Online] 2010, Languages and Compilers for Parallel Computing. Springer Berlin Heidelberg, [Retrieved from the Internet] <http://download.springer.com/static/pdf/571/chp%253A10.1007%252F978-3-642-13374-9_21.pdf> 15 pages.*

(Continued)

*Primary Examiner* — Thuy Dao
*Assistant Examiner* — Ravi K Sinha
(74) *Attorney, Agent, or Firm* — Fish & Richardson P.C.

(57) ABSTRACT

Methods, systems, and apparatus, including computer programs encoded on a computer storage medium, for receiving source code that contains a hot function that calls a multiversioned function, where a function definition of the multiversioned function specifies a first version and an alternative second version, and generating compiled code that includes a first and a second clone of the hot function, and a first and a second version of the multiversioned function. In the compiled code, the first clone of the hot function includes a direct call to the first version of the multiversioned function, and the second clone of the hot function includes a direct call to the second version of the multiversioned function.

21 Claims, 2 Drawing Sheets

(56) References Cited

OTHER PUBLICATIONS

Way, T., & Pollock, L., Using path spectra to direct function cloning, [Online] Oct. 1998, In Workshop on Profile and Feedback-Directed Compilation , [Retrieved from the Internet] <http://www.csc.villanova.edu/~tway/publications/wayWPFDC98.pdf> pp. 40-47.*

Wang, Cheng, Victor Ying, and Youfeng Wu, Supporting legacy binary code in a software transaction compiler with dynamic binary translation and optimization, [Online] 2008, Compiler Construction. Springer Berlin Heidelberg, [Retrieved from the Internet] <http://link.springer.com/chapter/10.1007/978-3-540-78791-4_20> 16 pages.*

Jason Mars and Robert Hundt, Scenario Based Optimization: A Framework for Statically Enabling Online Optimizations, [Online] 2009, In Proceedings of the 7th annual IEEE/ACM International Symposium on Code Generation and Optimization, Washington, DC, USA, [Retrieved from the Internet] <http://dx.doi.org/10.1109/CGO.2009.24> pp. 169-179.*

Lai, Michael. "New Optimizations in Version 4.2.3 of the x86 Open64 Compiler Suite." AMD Developer Central. Published Mar. 30, 2010. Accessed Feb. 25, 2013. Accessed from the Internet:URL:<http://web.archive.org/web/20111127034328/http://developer.amd.com/tools/open64/pages/NewOptimizationsinVersion423.aspx>. 4 Pages.

Levicki, I., et al. Forum Thread entitled "__declspec(cpu_specific)". Intel Developer Zone. Published. Mar. 2011. Accessed Feb. 25, 2013. Accessed from the Internet:URL:<http://software.intel.com/en-us/forums/topic/284935>. 4 Pages.

"Intel® Compiler Options for SSE Generation (SSE2, SSE3, SSE3_ATOM, SSSE3, SSE4.1, SSE4.2, AVX) and Processor-Specific Optimizations". Intel Software. Published Jan. 26, 2011. Accessed Feb. 25, 2013. Accessed from the Internet:URL:<http://web.archive.org/web/20110402190224/http://software.intel.com/en-us/articles/performance-tools-for-software-developers-intel-compiler-options-for-sse-generation-and-processor-specific-optimizations/>. 4 Pages.

Mars, J. et al. *Scenario Based Optimization: A Framework for Statically Enabling Online Optimizations*. CGO '09 Proceedings of the 7th annual IEEE/ACM International Symposium on Code Generation and Optimization. Mar. 2009. IEEE Computer Society Washington, DC, USA. 11 pages.

\* cited by examiner

MULTIVERSIONED FUNCTIONS

CROSS-REFERENCE TO RELATED APPLICATIONS

This application claims the benefit under 35 U.S.C. §119(e) to U.S. Provisional Patent Application No. 61/638,427, filed on Apr. 25, 2012 entitled "MULTIVERSIONED FUNCTIONS," the entirety of which is hereby incorporated by reference.

BACKGROUND

This specification relates to compiling computer programs that contain multiversioned functions.

Modern computer programs are typically written in a high-level programming language. A high-level programming language allows data structures and algorithms in a computer program to be expressed in a form that can be easily read and understood by a human programmer. A software tool, called a "compiler," can translate a computer program written in a high-level programming language into a set of intermediate code instructions or a set of low-level machine instructions, which can be executed by a computer's hardware. The program written in the high-level programming language is called the "source code." The set of low-level machine instructions is called "object code." In practice, a program typically includes multiple source code files from which a number of object code files can be derived. These multiple object code files and various libraries that include standard routines can be linked by a "linker" to create a single executable program. The executable program can then be executed on a computer.

Compilers can often perform various optimizations during program compilation to produce better performing object code, and consequently, more efficient executable programs. Common optimization techniques include loop optimization, data flow optimization, dead code elimination, inline expansion, constant propagation, and so on. The scope of code optimization can be intra-procedural, i.e., within a single procedure or code block, or inter-procedural, i.e., across multiple procedures or even multiple source code files.

Frequently executed functions are often compiled into different versions to take advantage of specific capabilities that are only present in some of the platforms on which the program is to be executed. Such capabilities, referred to in this description as "platform capabilities," include different central processing units (CPUs), different co-processors, different software platforms, or other environmental aspects. For example, a first version may be optimized for execution on a platform that supports the Streaming SIMD Extension 3 (SSE3) instruction set, and a second version may be optimized for execution on a platform that supports the Streaming SIMD Extension 4 (SSE4) instruction set.

Some compilers implement "function multiversioning" and generate code that includes instructions for multiple versions of a function, each optimized for different platform capabilities. Function multiversioning comes with the cost of determining at runtime which of the multiple versions should be executed. That is, each time a function with multiple versions is called, a dispatch check of the platform capabilities is performed so that dispatch to the appropriate version occurs.

SUMMARY

This specification describes technologies relating to compiling computer programs that contain multiversioned functions.

In general, one innovative aspect of the subject matter described in this specification can be embodied in a method that include receiving source code that contains a hot function that calls a multiversioned function, wherein a function definition of the multiversioned function specifies a first version and an alternative second version, and generating compiled code that includes: (1) a first clone of the hot function and a first version of the multiversioned function, wherein the first clone of the hot function includes a direct call to the first version of the multiversioned function, and (2) a second clone of the hot function and a second version of the multiversioned function, wherein the second clone of the hot function includes a direct call to the second version of the multiversioned function. Other embodiments of this aspect include corresponding systems, apparatus, and computer programs, configured to perform the actions of the methods, encoded on computer storage devices.

These and other embodiments can each optionally include one or more of the following features.

If the source code contains a cold function that calls the hot function, the method of generating the compiled code further includes generating compiled code that includes an indirect call from the cold function to the hot function, wherein the indirect call from the cold function calls either the first clone of the hot function or the second clone of the hot function.

If the source code contains a cold function that calls a first hot function in a chain of hot functions that includes the hot function that calls the multiversioned function, the method of generating the compiled code further includes generating compiled code that includes an indirect call from the cold function to the first hot function, wherein the indirect call from the cold function calls either a first clone of the first hot function or a second clone of the first hot function, and wherein (1) the first clone of the first hot function is in a first chain of hot functions that ends with the direct call to the first version of the multiversioned function, and (2) the second clone of the first hot function is in a second chain of hot functions that ends with the direct call to the second version of the multiversioned function.

The first version of the multiversioned function can be inlined in place of the corresponding direct call in the first clone of the hot function; the second version of the multiversioned function can be inlined in place of the corresponding direct call in the second clone of the hot function.

If the hot function that calls the multiversioned function is one of a plurality of hot functions in the source code that directly or indirectly calls the multiversioned function, the method further includes selecting, according to a hotness priority and a code bloat budget, one or more hot functions to be cloned, and generating compiled code that includes a respective first clone and a respective second clone of each of the selected one or more hot functions.

If the hot function that calls the multiversioned function is a hot multiversioned function, and a function definition of the hot multiversioned function specifies a plurality of alternative versions, the method further includes generating compiled code that includes: (1) a first clone of a first version of the hot multiversioned function, wherein the first clone of the first version of the hot multiversioned function includes a direct call to the first version of the multiversioned function, (2) a first clone of a second version of the hot multiversioned function, wherein the first clone of the second version of the hot multiversioned function includes a direct call to the first version of the multiversioned function, (3) a second clone of the first version of the hot multiversioned function, wherein the second clone of the first version of the hot multiversioned function includes a direct call to the second version of the multiversioned function, (4) a second clone of the second version of the hot multiversioned function, wherein the second clone of the second version of the hot multiversioned function includes a direct call to the second version of the multiversioned function.

The first version of the multiversioned function can be inlined in the first clone of the first version of the hot multiversioned function; the first version of the multiversioned function can be inlined in the first clone of the second version of the hot multiversioned function; the second version of the multiversioned function can be inlined in the second clone of the first version of the hot multiversioned function; the second version of the multiversioned function can be inlined in the second clone of the second version of the hot multiversioned function.

Particular embodiments of the subject matter described in this specification can be implemented so as to realize one or more of the following advantages.

Overhead associated with dispatch checks is reduced when they are hoisted out of hot functions, i.e., frequently executed functions, and placed in cold functions. By cloning the hot functions and hoisting the dispatch, a compiler can unblock function inlining of multiversioned functions and hot functions that call them, allowing the compiler to perform optimizations across what would otherwise be function call boundaries. A compiler can generate code that realizes most of the performance benefits of a fat binary that includes a respective binary instance for each unique combination of platform capabilities, without subjecting users to the burden of dealing with large executable files.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
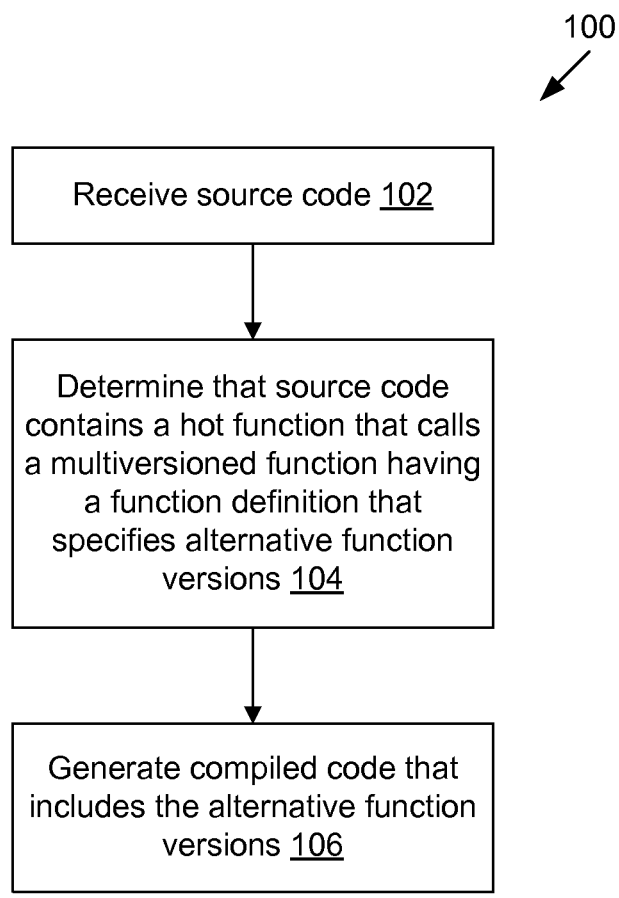
FIG. 1 is a flow diagram of an example process for performing profile-guided optimization of the generation of multiple compiled versions of functions according to a compiler directive.

FIG. 1 is a flow diagram of an example process 100 for performing profile-guided optimization of the generation of multiple compiled versions of functions according to a compiler directive.

Profile-guided optimization refers generally to an optimization technique that optimizes a compiled program based on statistics obtained during earlier runs of the compiled program. The program is initially compiled with options to gather statistics, and then run to generate the statistics, and finally recompiled using the statistics. The statistics can be used to identify the respective execution frequencies of functions within the program, i.e., how frequently the functions are called. Compilers that perform profile-guided optimization can classify functions that are called most frequently or those that are called at least a threshold number of times or at a threshold rate as hot functions. All remaining functions may be referred to as cold functions. Optimization of multiversioned functions in the compiled code can be performed as described in this specification regardless of how the compiler or other module identifies functions as being hot or cold.

In the example process 100, the compiler receives (102) source code for a program. The compiler determines (104) that the source code contains a hot function that calls a multiversioned function, where a function definition of the multiversioned function specifies a number of alternative function versions. Finally, the compiler generates (106) compiled code that includes the alternative function versions of the multiversioned function.

Table 1, below, shows a simplified example of source code that may be received by the compiler.

TABLE 1

| | |
|---|---|
| void foo ( ) | // Is a cold function. |
| { | |
| ... | |
| bar ( ); | // Call bar. |
| ... | |
| } | |
| void bar ( ) | // Is a hot function. |
| { | |
| ... | |
| zippy ( ); | // Call zippy. |
| ... | |
| } | |
| void __attribute__ ((mversion(default, "<CPU_A>"))) | |
| zippy ( ) | // Is a hot multiversioned function. |
| { | |
| ... | |
| } | |

In this example, there are three functions, namely foo ( ), bar ( ), and zippy ( ). The function zippy ( ) is defined with an illustrative mversion attribute, which indicates that the compiler should compile zippy ( ) as a multiversioned function. The compiler uses profiling information for the program to determine that the source code contains a cold function foo ( ) that calls a hot function bar ( ) that calls a hot multiversioned function zippy ( ). The function definition instructs the compiler to generate (i) a version of the function zippy ( ) that is optimized for execution on any computing device that includes a processor identified as <CPU_A>, and (ii) a generic version. Although only two versions are illustrated, the compiler can handle any number of multiple versions.

Conventionally, a compiler will generate compiled code that includes a branch to or selection of the appropriate version of a multiversioned function at the point or points in the code where the function is called. An example of such compiled generated from the code of Table 1 is shown in Table 2, below.

TABLE 2

| | |
|---|---|
| void (*zippy) ( ); | // Function pointer for zippy |
| void init_zippy ( ) | // Dispatch code for zippy that runs once at startup. |
| { | |
| /* Initialize pointer to zippy to the right version based on platform capabilities.*/ | |
| if (arch_type == <CPU_A>) | |
|   zippy = &zippy_1; | |
| else | |
|   zippy = &zippy_2; | |
| } | |
| void zippy_1 ( ) | // Version optimized for arch_type == <CPU_A> |
| { | |
| ... | |
| } | |
| void zippy_2 ( ) | // Generic version |
| { | |
| ... | |
| } | |

TABLE 2-continued

```
void foo ( )           // Is a cold function.
{
 ...
 bar ( );              // Call bar.
}
void bar ( )           // Is a hot function.
{
 ...
 (*zippy)( );          // Call to zippy is an indirect call.
}
```

Figure 2:
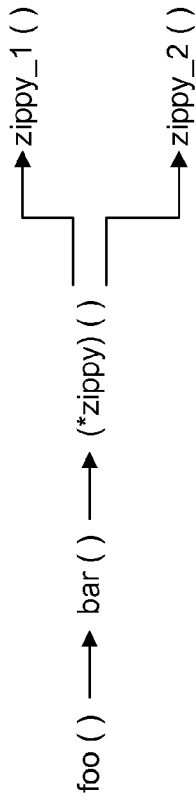
FIG. 2 shows a call graph of the compiled code of Table 2.

FIG. 2 shows a call graph of the compiled code of Table 2. This compiled code includes a cold function foo ( ) that calls a hot function bar ( ) that calls one of two alternative versions of the function zippy ( ) with an indirect function call. The compiled code further includes dispatch code that is executed at startup to determine the platform capabilities of the computing device on which the compiled code is being executed. The result of the platform capabilities determination is used to initialize the various pointers as described below; in particular, the dispatch code initializes the pointer zippy through which the indirect call to the appropriate version of zippy ( ) is made.

An indirect call to the function prevents the compiler from inlining of the code of the function zippy ( ), which may limit the optimizations that may be performed by the compiler during program compilation. Further, including any code in bar ( ) that selects a function version may reduce program performance because the function bar ( ) is a hot function.

A compiler may be implemented to generate, from the code of Table 1, compiled code that allows for direct calls to be made to each alternative version of the multiversioned function, as shown in Table 3, below.

TABLE 3

```
void (*bar)( ); // Function pointer for bar.
init_bar ( );
{
 if (arch_type == <CPU_A>)
  bar = &bar_clone_1;
 else
  bar = &bar_clone_2 ;
}
void zippy _1 ( ) // Version optimized for arch_type == <CPU_A>
{
 ...
}
void zippy_2 ( ) // Generic version
{
 ...
}
void bar clone 1 ( )      // First clone of function bar
{
 ...
 zippy _1 ( ); // Direct call to version of zippy optimized for
   arch_type == <CPU_A>
}
void bar_clone _2 ( )     // Second clone of function bar
{
 ...
 zippy_2 ( );             // Direct call to generic version of zippy
}
void foo ( )              // Is a cold function.
{
 ...
 (*bar)( );               // Call to bar is an indirect call.
}
```

Figure 3:
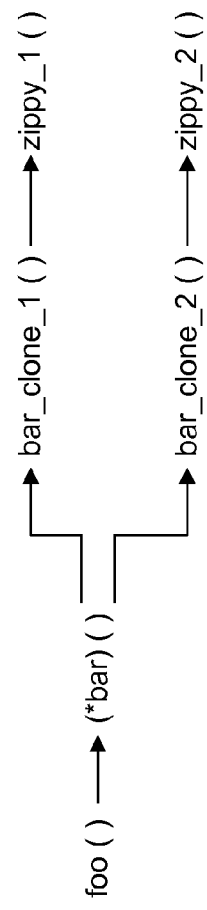
FIG. 3 shows a call graph of the compiled code of Table 3.

FIG. 3 shows a call graph of the compiled code of Table 3. In this example, the compiled code includes a cold function foo ( ) that calls one of two clones of the hot function bar ( ), each of which in turn makes a direct call to a corresponding one of the two alternative versions of the function zippy ( ).

If the computing device includes a processor identified as <CPU_A>, the pointer bar is initialized at startup to the address of the function bar_clone_1 ( ). As a result, the cold function foo ( ) makes an indirect call to the hot function bar_clone_1( ). In the hot function bar_clone_1( ), for each original call to zippy ( ), a direct call is made to zippy_1 ( ). Although the indirect call to the function bar_clone_1( ) blocks inlining of the code of the function bar ( ), program performance should be acceptable, because the function foo ( ) is a cold function. By hoisting the dispatch check out of the hot multiversioned function zippy ( ) and the hot function bar ( ), runtime overhead is decreased, which has a positive effect on program performance. Further, having cloned the hot function bar ( ) and the function zippy ( ), the compiler can inline the function zippy ( ), enabling the compiler to perform optimizations across what would otherwise be a function call boundary.

If the computing device does not include a processor identified as <CPU_A>, the pointer bar is initialized at startup to the address of the function_bar_clone_2 ( ).

In the above example source code, the cold function foo ( ) makes a call to a hot function bar ( ), which itself makes a call to a hot multiversioned function zippy ( ).

Figure 4:
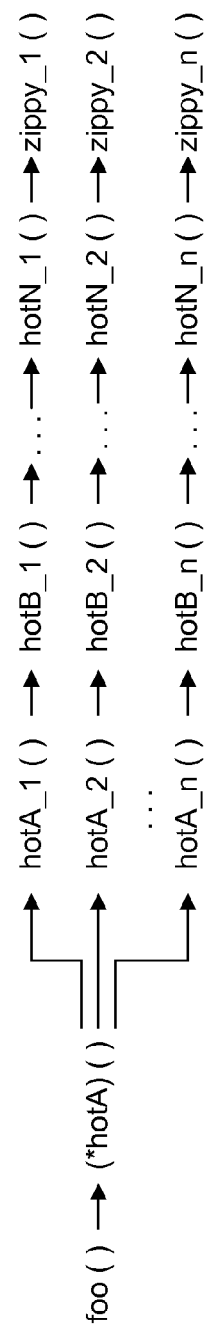
FIG. 4 illustrates the compiled code for a chain of calls from hot functions ending in a call to a multiversioned function.

FIG. 4 illustrates the compiled code for a chain of calls from hot functions ending in a call to a multiversioned function. In the illustrated example, the compiler compiles source code that includes a call made in a cold function foo ( ) to a hot function hotA ( ) that is the first in a chain of hot functions hotB ( ) through hotN ( ) the last of which calls a hot multiversioned function zippy ( ). With such source code, the compiled code will include a clone of each of the hot functions and the multiversioned function, rather than just a clone of one hot function and the multiversioned function as was illustrated in Table 3 and FIG. 3. As shown in FIG. 4, the chain of hot functions that ultimately call zippy_1 ( ), which is a first version of the multiversioned function, is made up of clones of the hot functions, designated hotA_1 through hotN_1, that ends in a function hotN_1 that directly calls zippy_1; and the chain of hot functions that ultimately call zippy_2 ( ), which is a second version of the multiversioned function, is made up of clones of the hot functions, designated hotA_2 through hotN_2, that ends in a function hotN_2 that directly calls zippy_2. The clones of a given hot function are identical except in their respective calls to the next hot function in the chain of calls or in their respective calls to versions of the multiversioned function. If the compiler generates more versions of the multiversioned function, it will generate more clones of the hot functions in a chain that ends in a hot function that directly calls a corresponding version of the multiversioned function. This is illustrated in FIG. 4 with a chain of hot functions hotA_n through hotN_n and a corresponding version zippy_n of the multiversioned function. In this way, the compiler can hoist the dispatch check out of all the hot functions in a chain of functions that call a hot multiversioned function.

Generally, the compiled code includes multiple alternative versions of each multiversioned function. The determination as to which respective version of each multiversioned function is called is determined at runtime based on the platform capabilities of the computing device on which the compiled code is being executed.

In the examples described above, the source code includes a single multiversioned function and the compiler hoisted the dispatch checks out to a closest call from a cold function. In some implementations, a compiler handles source code that includes one or more multiversioned functions by cloning the hot multiversioned functions according to a hotness priority and a code bloat budget so as to achieve increased program performance while maintaining the code size below a threshold. In some implementations, the compiler has the capability to rank order the hot multiversioned functions according to the respective execution frequencies of the functions, and clone only those functions having execution frequencies that exceed a predefined threshold.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving source code that contains a cold function and a hot function, the hot function calls a multiversioned function, wherein a function definition of the multiversioned function specifies a first version and an alternative second version;
   conducting a dispatch check, wherein the dispatch check is hoisted from the hot function to the cold function for initiation;
   generating compiled code that includes: (1) a first clone of the hot function and a first version of the multiversioned function, wherein the first clone of the hot function includes a direct call to the first version of the multiversioned function, and (2) a second clone of the hot function and a second version of the multiversioned function, wherein the second clone of the hot function includes a direct call to the second version of the multiversioned function, wherein the cold function, the hot function, the first clone, the first version, the second clone, and the second version are distinct from each other;
   determining whether to use the first version of the multiversioned function or the second version of the multiversioned function, the determination based at least in part on the dispatch check; and
   selecting, based on the determination, either the first clone and first version of the multiversioned function or the second clone and the second version of the multiversioned function.

2. The computer-implemented method of claim 1, wherein the source code further contains a cold function that calls the hot function, and wherein generating the compiled code further comprises:
   generating compiled code that includes an indirect call from the cold function to the hot function, wherein the indirect call from the cold function calls either the first clone of the hot function or the second clone of the hot function.

3. The computer-implemented method of claim 1, wherein the source code further contains a cold function that calls a first hot function in a chain of hot functions that includes the hot function that calls the multiversioned function, and wherein generating the compiled code further comprises:
   generating compiled code that includes an indirect call from the cold function to the first hot function, wherein the indirect call from the cold function calls either a first clone of the first hot function or a second clone of the first hot function, and wherein (1) the first clone of the first hot function is in a first chain of hot functions that ends with the direct call to the first version of the multiversioned function, and (2) the second clone of the first hot function is in a second chain of hot functions that ends with the direct call to the second version of the multiversioned function.

4. The computer-implemented method of claim 1, wherein generating the compiled code includes inlining the first version of the multiversioned function in place of the corresponding direct call in the first clone of the hot function, and inlining the second version of the multiversioned function in place of the corresponding direct call in the second clone of the hot function.

5. The computer-implemented method of claim 1, wherein the hot function that calls the multiversioned function is one of a plurality of hot functions in the source code that directly or indirectly calls the multiversioned function, the method further comprising:
   selecting, according to a hotness priority and a code bloat budget, one or more hot functions to be cloned; and
   generating compiled code that includes a respective first clone and a respective second clone of each of the selected one or more hot functions.

6. The computer-implemented method of claim 1, wherein the hot function that calls the multiversioned function is a hot multiversioned function, and wherein a function definition of the hot multiversioned function specifies a plurality of alternative versions, the method further comprising:
   generating compiled code that includes: (1) a first clone of a first version of the hot multiversioned function, wherein the first clone of the first version of the hot multiversioned function includes a direct call to the first version of the multiversioned function, (2) a first clone of a second version of the hot multiversioned function, wherein the first clone of the second version of the hot multiversioned function includes a direct call to the first version of the multiversioned function, (3) a second clone of the first version of the hot multiversioned function, wherein the second clone of the first version of the hot multiversioned function includes a direct call to the second version of the multiversioned function, and (4) a second clone of the second version of the hot multiversioned function, wherein the second clone of the second version of the hot multiversioned function includes a direct call to the second version of the multiversioned function.

7. The computer-implemented method of claim 6, wherein generating the compiled code further comprises:
   inlining the first version of the multiversioned function in the first clone of the first version of the hot multiversioned function;
   inlining the first version of the multiversioned function in the first clone of the second version of the hot multiversioned function;
   inlining the second version of the multiversioned function in the second clone of the first version of the hot multiversioned function; and
   inlining the second version of the multiversioned function in the second clone of the second version of the hot multiversioned function.

8. A non-transitory computer storage medium encoded with a computer program, the program comprising instructions that when executed by one or more computers cause the one or more computers to perform operations comprising:
   receiving source code that contains a cold function and a hot function, the hot function calls a multiversioned function, wherein a function definition of the multiversioned function specifies a first version and an alternative second version;

conducting a dispatch check, wherein the dispatch check is hoisted from the hot function to the cold function for initiation;

generating compiled code that includes: (1) a first clone of the hot function and a first version of the multiversioned function, wherein the first clone of the hot function includes a direct call to the first version of the multiversioned function, and (2) a second clone of the hot function and a second version of the multiversioned function, wherein the second clone of the hot function includes a direct call to the second version of the multiversioned function, wherein the cold function, the hot function, the first clone, the first version, the second clone, and the second version are distinct from each other;

determining whether to use the first version of the multiversioned function or the second version of the multiversioned function, the determination based at least in part on the dispatch check; and selecting, based on the determination, either the first clone and first version of the multiversioned function or the second clone and the second version of the multiversioned function.

9. The computer storage medium of claim 8, wherein the source code further contains a cold function that calls the hot function, and wherein the operations further comprise:

generating compiled code that includes an indirect call from the cold function to the hot function, wherein the indirect call from the cold function calls either the first clone of the hot function or the second clone of the hot function.

10. The computer storage medium of claim 8, wherein the source code further contains a cold function that calls a first hot function in a chain of hot functions that includes the hot function that calls the multiversioned function, and wherein the operations further comprise: generating compiled code that includes an indirect call from the cold function to the first hot function, wherein the indirect call from the cold function calls either a first clone of the first hot function or a second clone of the first hot function, and wherein (1) the first clone of the first hot function is in a first chain of hot functions that ends with the direct call to the first version of the multiversioned function, and (2) the second clone of the first hot function is in a second chain of hot functions that ends with the direct call to the second version of the multiversioned function.

11. The computer storage medium of claim 8, wherein the operations for generating the compiled code comprise:

inlining the first version of the multiversioned function in place of the corresponding direct call in the first clone of the hot function; and inlining the second version of the multiversioned function in place of the corresponding direct call in the second clone of the hot function.

12. The computer storage medium of claim 8, wherein the hot function that calls the multiversioned function is one of a plurality of hot functions in the source code that directly or indirectly calls the multiversioned function, the operations further comprising:

selecting, according to a hotness priority and a code bloat budget, one or more hot functions to be cloned; and generating compiled code that includes a respective first clone and a respective second clone of each of the selected one or more hot functions.

13. The computer storage medium of claim 8, wherein the hot function that calls the multiversioned function is a hot multiversioned function, and wherein a function definition of the hot multiversioned function specifies a plurality of alternative versions, the operations further comprising:

generating compiled code that includes: (1) a first clone of a first version of the hot multiversioned function, wherein the first clone of the first version of the hot multiversioned function includes a direct call to the first version of the multiversioned function, (2) a first clone of a second version of the hot multiversioned function, wherein the first clone of the second version of the hot multiversioned function includes a direct call to the first version of the multiversioned function, (3) a second clone of the first version of the hot multiversioned function, wherein the second clone of the first version of the hot multiversioned function includes a direct call to the second version of the multiversioned function, (4) a second clone of the second version of the hot multiversioned function, wherein the second clone of the second version of the hot multiversioned function includes a direct call to the second version of the multiversioned function.

14. The computer storage medium of claim 13, wherein the operations for generating the compiled code further comprise:

inlining the first version of the multiversioned function in the first clone of the first version of the hot multiversioned function;

inlining the first version of the multiversioned function in the first clone of the second version of the hot multiversioned function;

inlining the second version of the multiversioned function in the second clone of the first version of the hot multiversioned function; and inlining the second version of the multiversioned function in the second clone of the second version of the hot multiversioned function.

15. A system comprising:

one or more computers; and a computer storage medium encoded with a computer program, the program comprising instructions that when executed by the one or more computers cause the one or more computers to perform operations comprising:

receiving source code that contains a cold function and a hot function, the hot function calls a multiversioned function, wherein a function definition of the multiversioned function specifies a first version and an alternative second version;

conducting a dispatch check, wherein the dispatch check is hoisted from the hot function to the cold function for initiation;

generating compiled code that includes: (1) a first clone of the hot function and a first version of the multiversioned function, wherein the first clone of the hot function includes a direct call to the first version of the multiversioned function, and (2) a second clone of the hot function and a second version of the multiversioned function, wherein the second clone of the hot function includes a direct call to the second version of the multiversioned function, wherein the cold function, the hot function, the first clone, the first version, the second clone, and the second version are distinct from each other;

determining whether to use the first version of the multiversioned function or the second version of the multiversioned function, the determination based at least in part on the dispatch check; and selecting, based on the determination, either the first clone and first version of the multiversioned function or the second clone and the second version of the multiversioned function.

16. The system of claim 15, wherein the source code further contains a cold function that calls the hot function, and wherein the operations for generating the compiled code further comprise:

generating compiled code that includes an indirect call from the cold function to the hot function, wherein the indirect call from the cold function calls either the first clone of the hot function or the second clone of the hot function.

17. The system of claim 15, wherein the source code further contains a cold function that calls a first hot function in a chain of hot functions that includes the hot function that calls the multiversioned function, and wherein the operations for generating the compiled code further comprise:

generating compiled code that includes an indirect call from the cold function to the first hot function, wherein the indirect call from the cold function calls either a first clone of the first hot function or a second clone of the first hot function, and wherein (1) the first clone of the first hot function is in a first chain of hot functions that ends with the direct call to the first version of the multiversioned function, and (2) the second clone of the first hot function is in a second chain of hot functions that ends with the direct call to the second version of the multiversioned function.

18. The system of claim 15, wherein the operations for generating the compiled code further comprise:

inlining the first version of the multiversioned function in place of the corresponding direct call in the first clone of the hot function; and inlining the second version of the multiversioned function in place of the corresponding direct call in the second clone of the hot function.

19. The system of claim 15, wherein the hot function that calls the multiversioned function is one of a plurality of hot functions in the source code that directly or indirectly calls the multiversioned function, the operations further comprising:

selecting, according to a hotness priority and a code bloat budget, one or more hot functions to be cloned; and generating compiled code that includes a respective first clone and a respective second clone of each of the selected one or more hot functions.

20. The system of claim 15, wherein the hot function that calls the multiversioned function is a hot multiversioned function, and wherein a function definition of the hot multiversioned function specifies a plurality of alternative versions, the operations further comprising:

generating compiled code that includes: (1) a first clone of a first version of the hot multiversioned function, wherein the first clone of the first version of the hot multiversioned function includes a direct call to the first version of the multiversioned function, (2) a first clone of a second version of the hot multiversioned function, wherein the first clone of the second version of the hot multiversioned function includes a direct call to the first version of the multiversioned function, (3) a second clone of the first version of the hot multiversioned function, wherein the second clone of the first version of the hot multiversioned function includes a direct call to the second version of the multiversioned function, (4) a second clone of the second version of the hot multiversioned function, wherein the second clone of the second version of the hot multiversioned function includes a direct call to the second version of the multiversioned function.

21. The system of claim 20, wherein the operations for generating the compiled code further comprise:

inlining the first version of the multiversioned function in the first clone of the first version of the hot multiversioned function;

inlining the first version of the multiversioned function in the first clone of the second version of the hot multiversioned function;

inlining the second version of the multiversioned function in the second clone of the first version of the hot multiversioned function; and inlining the second version of the multiversioned function in the second clone of the second version of the hot multiversioned function.

* * * * *